United States Patent
Strong et al.

(10) Patent No.: US 6,519,399 B2
(45) Date of Patent: Feb. 11, 2003

(54) FIBER OPTIC CABLE WITH PROFILED GROUP OF OPTICAL FIBERS

(75) Inventors: Patrick K. Strong, Connelly Springs, NC (US); Michael L. Elmore, Hickory, NC (US); Jason C. Lail, Conover, NC (US); Douglas S. Hedrick, Connelly Springs, NC (US); Eddie H. Hudson, Conover, NC (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 09/930,415

(22) Filed: Aug. 15, 2001

(65) Prior Publication Data

US 2002/0122640 A1 Sep. 5, 2002

Related U.S. Application Data

(63) Continuation-in-part of application No. 09/789,048, filed on Feb. 19, 2001.

(51) Int. Cl.[7] .................................................. G02B 6/44
(52) U.S. Cl. ........................ 385/114; 385/109; 385/111
(58) Field of Search ................................. 385/100–114

(56) References Cited

U.S. PATENT DOCUMENTS

| | | | |
|---|---|---|---|
| 4,078,853 A | 3/1978 | Kempf et al. | 350/96.23 |
| 4,185,887 A | 1/1980 | Ferrentino | 350/96.23 |
| 4,878,732 A | 11/1989 | Rohner et al. | 350/96.23 |
| 4,984,859 A | 1/1991 | Fujigaki et al. | 350/96.24 |
| 5,013,127 A | 5/1991 | Bernard | 350/96.23 |
| 5,166,998 A | 11/1992 | Patel | 385/114 |
| 5,177,509 A | 1/1993 | Johansen et al. | 351/44 |
| 5,177,809 A * | 1/1993 | Zeidler | 385/105 |
| 5,212,756 A | 5/1993 | Eoll | 385/114 |
| 5,249,249 A | 9/1993 | Eoll et al. | 385/114 |
| 5,293,443 A | 3/1994 | Eoll et al. | 385/114 |
| 5,353,365 A | 10/1994 | Dumas et al. | 385/102 |
| 5,369,720 A | 11/1994 | Parry et al. | 385/114 |
| 5,487,126 A | 1/1996 | Oestreich et al. | 385/105 |
| 5,531,064 A | 7/1996 | Sawano et al. | 57/204 |
| 5,608,832 A | 3/1997 | Pfandl et al. | 385/112 |
| 5,857,051 A | 1/1999 | Travieso et al. | 385/114 |
| 5,862,284 A | 1/1999 | Paborn et al. | 385/106 |
| 5,878,180 A | 3/1999 | Nothofer et al. | 385/114 |
| 6,014,487 A | 1/2000 | Field et al. | 385/114 |
| 6,064,789 A | 5/2000 | Mills et al. | 385/114 |
| 6,192,178 B1 | 2/2001 | Logan et al. | 385/109 |

FOREIGN PATENT DOCUMENTS

| | | | |
|---|---|---|---|
| DE | 19838351 A1 * | 2/2000 | |
| EP | 0495241 A2 | 12/1991 | G02B/6/44 |

OTHER PUBLICATIONS

Pirelli MassLink "1,152–fiber Ribbon In Loose Tube with Dri–Flex Technology", Oct. 31, 2000.
Pirelli MassLink "1728–fiber Ribbon In Loose Tube with Dri–Flex Technology", 10, 31/00.

* cited by examiner

Primary Examiner—Hemang Sanghavi
(74) Attorney, Agent, or Firm—Michael E. Carroll, Jr.

(57) ABSTRACT

A fiber optic cable including at least one tube assembly therein. The tube assembly includes an optical fiber ribbon stack in a tube. The optical fiber ribbon stack comprises optical fiber ribbons arranged at least partially in a gradually decreasing optical fiber count profile. A diagonal free space of the tube assembly being about 0.5 mm to about 5 mm. The diagonal free space is defined as the tube inner diameter minus the maximum diagonal length of the ribbon stack. The maximum diagonal length of the ribbon stack being the greater of either a diagonal measurement across lateral subgroups of the ribbon stack or a diagonal measurement across a major dimension of a medial subgroup of the ribbon stack.

32 Claims, 6 Drawing Sheets

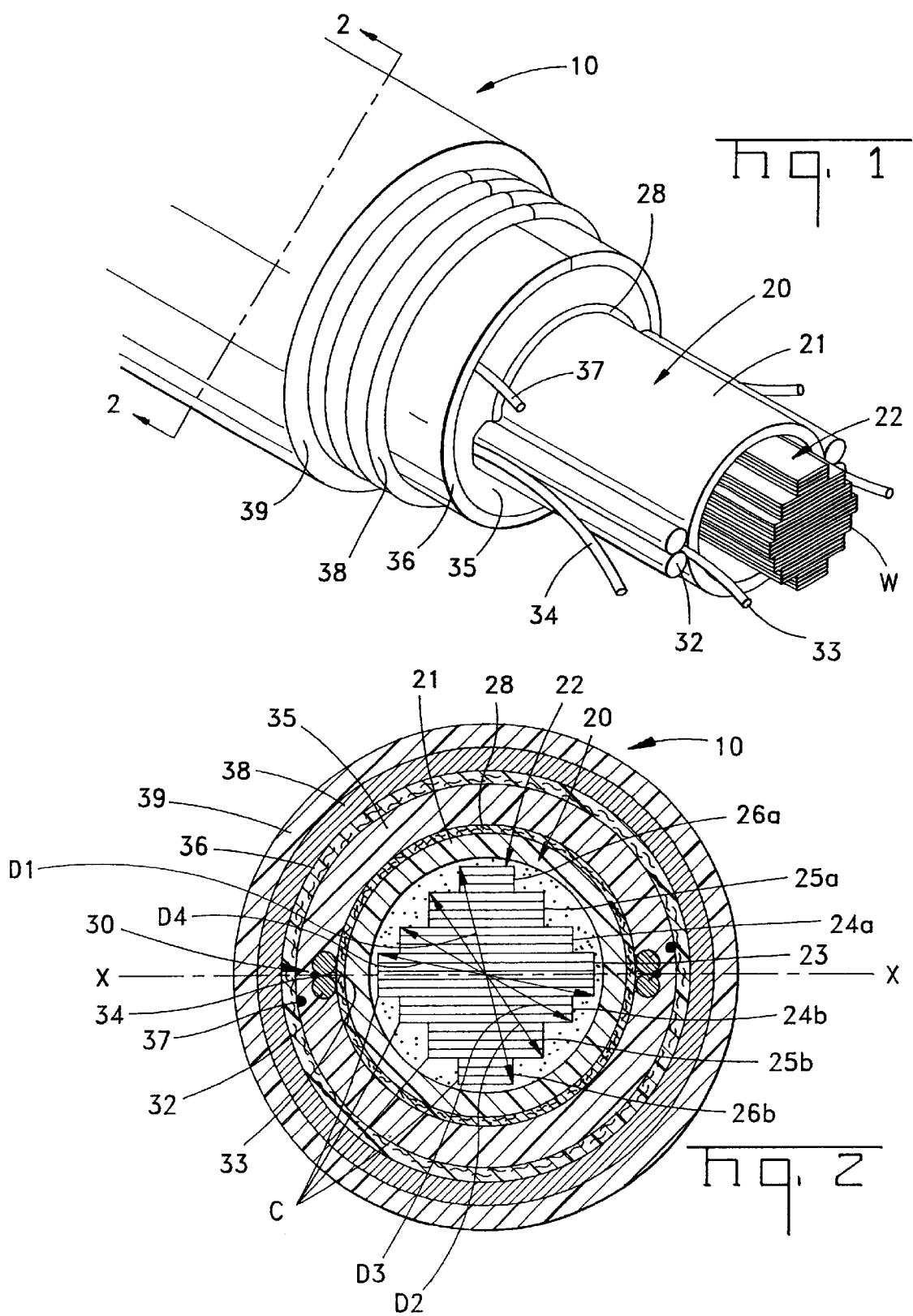

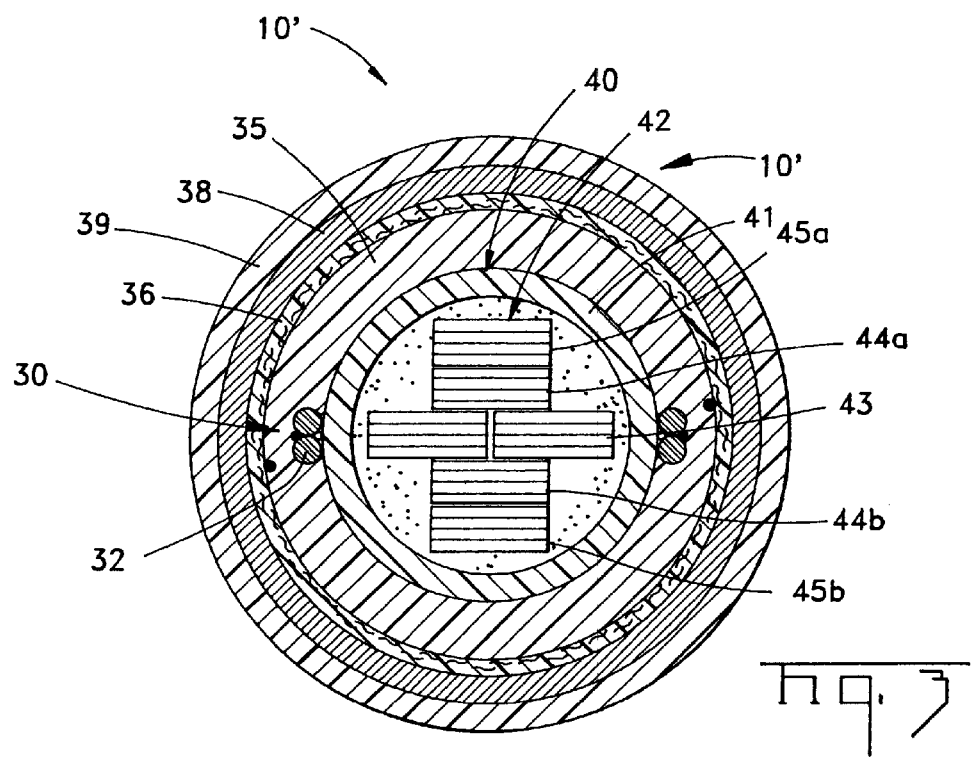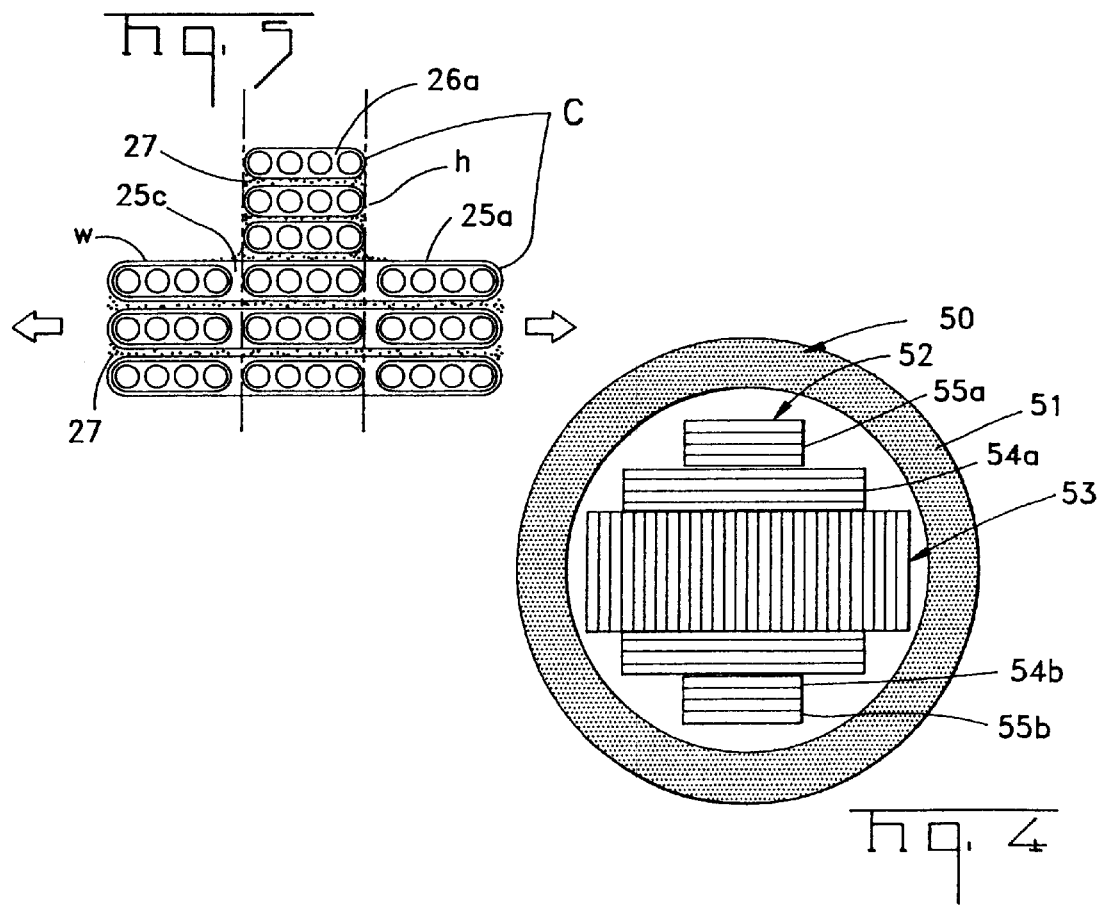

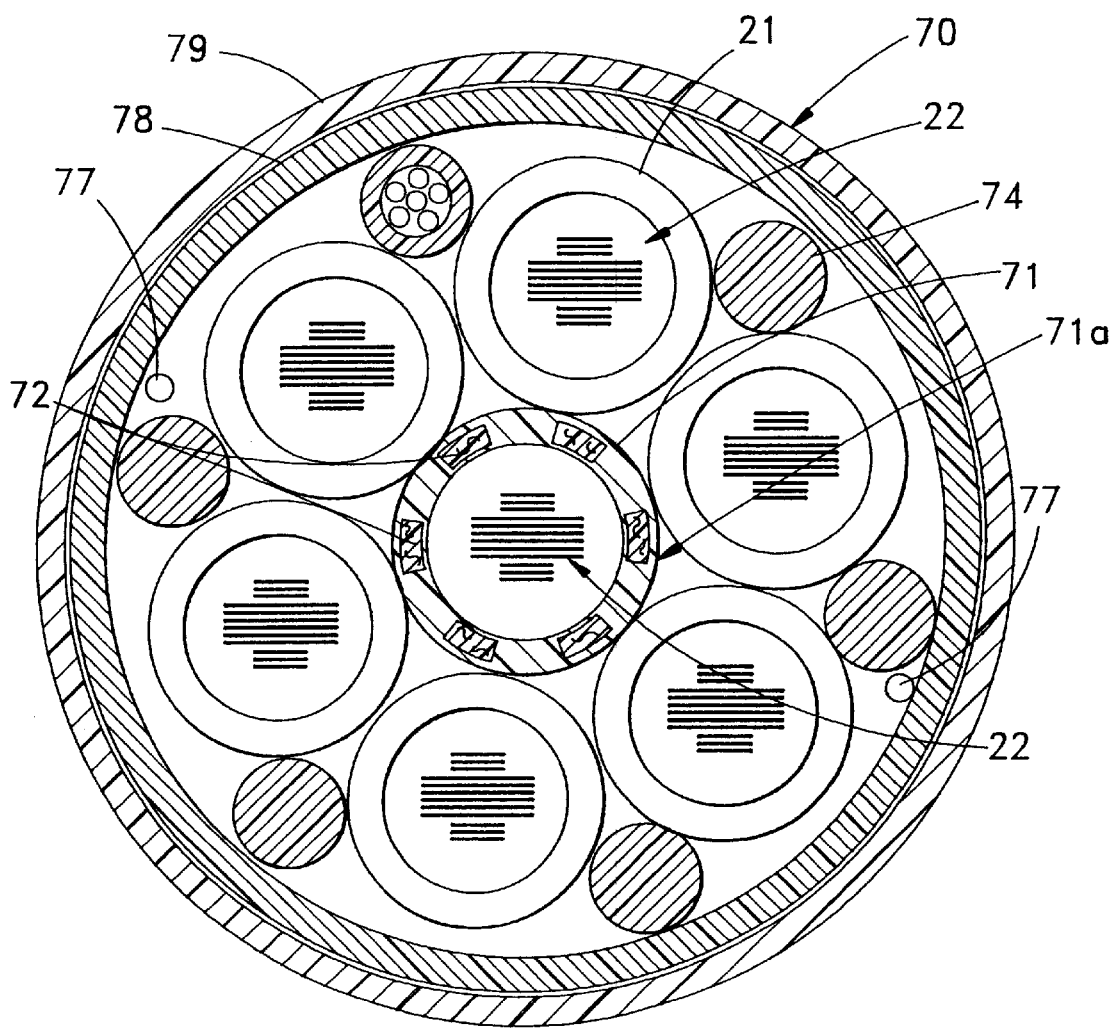
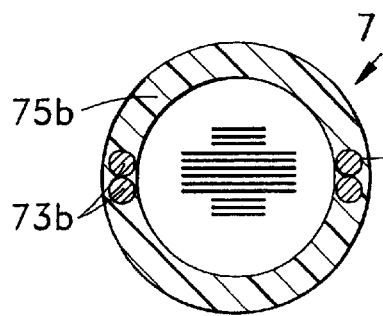
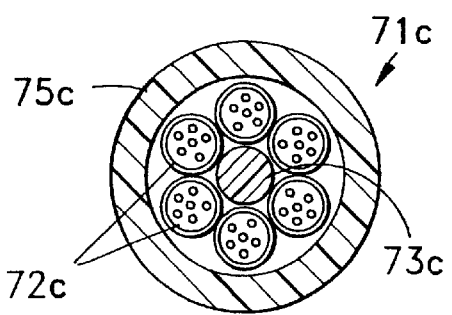

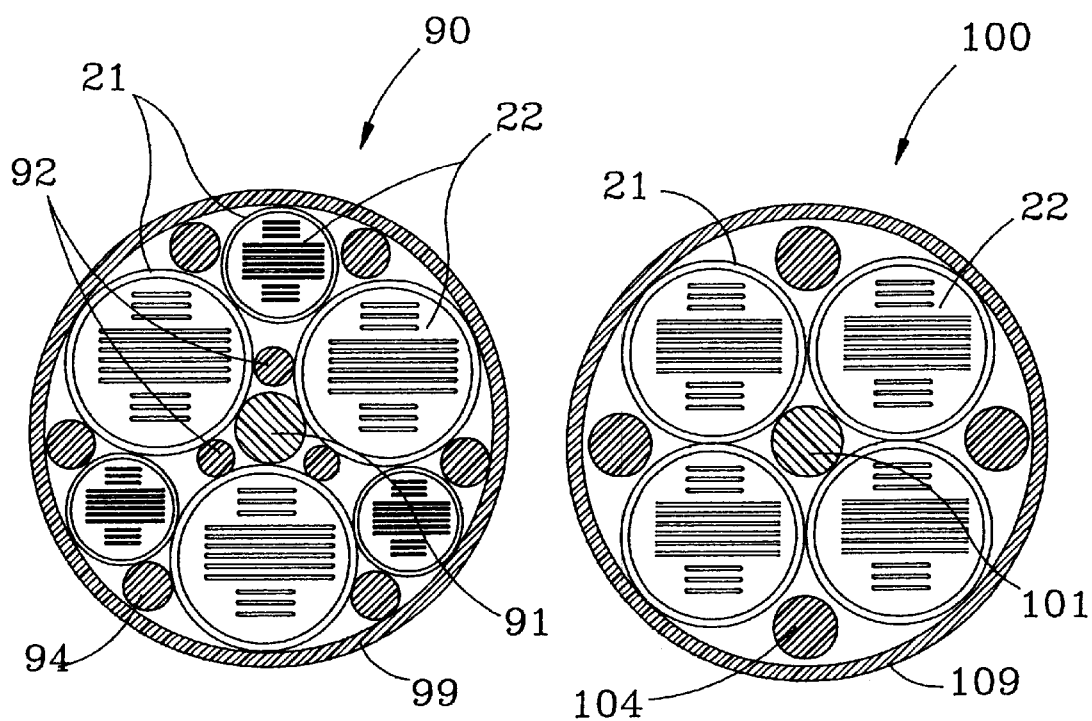
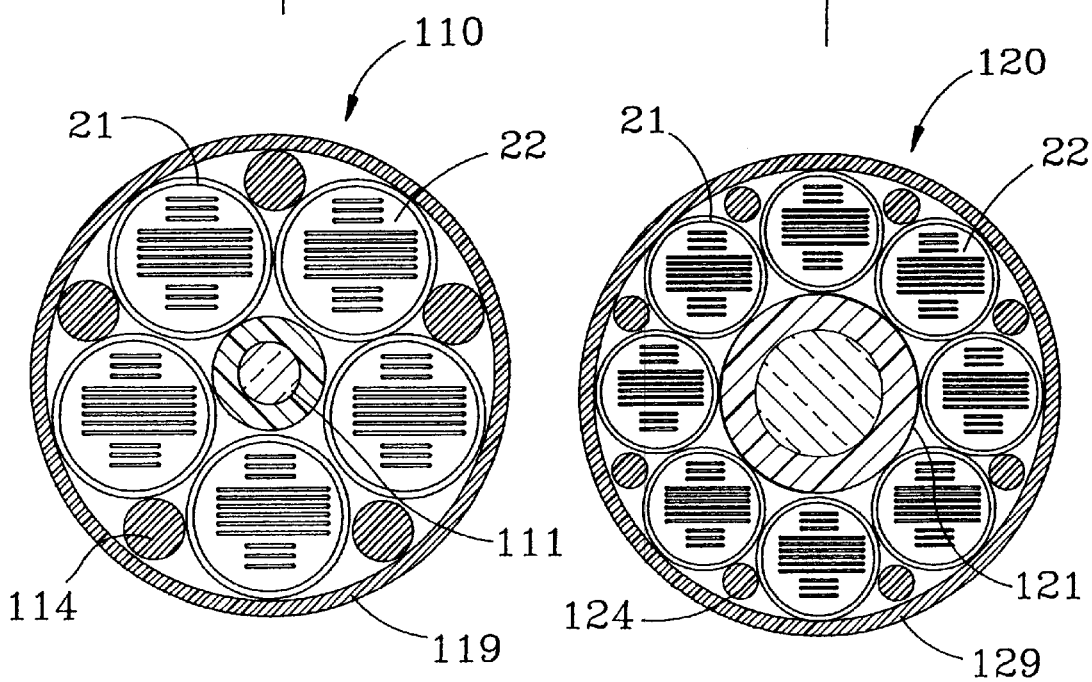

FIBER OPTIC CABLE WITH PROFILED GROUP OF OPTICAL FIBERS

The present application is a Continuation-in-Part of U.S. Ser. No. 09/789,048 filed Feb. 19, 2001, which is incorporated herein by reference.

FIELD OF THE INVENTION

The present inventions relate to fiber optic cables and, more particularly, to fiber optic cables with at least one profiled group of optical fibers.

BACKGROUND OF THE INVENTION

Fiber optic cables include optical fibers that transmit signals, for example, voice, video and/or data information. Where the fiber optic cable is subjected to forces, the optical fibers may be stressed and attenuation of the transmitted light may occur. It is therefore important for fiber optic cables to be constructed in a robust manner whereby stress-induced attenuation can be avoided or minimized. In addition, although it is generally desirable for a fiber optic cable to have a high optical fiber count, it is also desirable for the cable to be as compact as possible, thereby maximizing optical fiber density.

One application for fiber optic cables is routing the cable in a duct. For example, in urban environments a telecommunication provider may desire to replace an old cable in an existing duct with a new cable. In one case, the telecommunication provider can attach the new cable to an end of the old cable and remove the old cable from the other end of the existing duct. While the old cable is removed from the existing duct, the new cable is installed in the existing duct.

a) High Fiber Count Cables in General

High fiber count cables can be classified into three general design categories, namely: single tube, stranded tube, and slotted core. Each category may include optical fiber ribbons and/or bundled optical fibers. The physical characteristics and/or optical performance of high fiber count cable designs can include, for example: general properties such as packing density, cable diameter, weight and flexibility; cable performance attributes such as environmental performance, mechanical performance, and polarization mode dispersion attributes; and field characteristics such as installation methods, cable stripping, and mid-span access.

b) Background Art

Known cable designs that include optical fiber ribbons, and are classifiable into one of the three general categories, can define a backdrop for the present invention. For example, U.S. Pat. No. 5,608,832, which is incorporated by reference herein, includes a central member. More specifically, the design includes stacks of optical fiber ribbons formed by three optical fiber ribbons disposed in respective three-sided chamber elements of approximately a U-shaped cross section. The chamber elements are stranded around the central member that includes a tensile element and an extruded plastic layer. U.S. Pat. No. 5,249,249 and U.S. Pat. No. 5,293,443, which are respectively incorporated by reference herein, also disclose designs employing central members. The respective disclosures describe a compartment holding at least two side-by-side stacks of optical fiber ribbons.

U.S. Pat. No. 5,177,809, which is incorporated by reference herein, includes a slotted rod. Disclosed therein is an optical cable having a plurality of light waveguides in a group of bands that are arranged in longitudinally extending chambers of a slotted rod. Each of the chambers in the slotted rod can have an increasing width as the radial distance from the center of the slotted rod increases. The bands can be arranged in sub-stacks having increasing widths corresponding to the increased width of the chamber. In another embodiment, each of the bands in the stack has an increasing width in the radial direction to fill the chamber. Alternatively, each of the chambers has a rectangular cross section, with the cross section increasing in a step-like manner due to steps formed in partitions separating the chambers. The bands that are arranged in the chambers are arranged in sub-stacks to fill each portion of the chamber.

The background of the present invention can include single tube cable designs having optical fiber ribbons. For example, U.S. Pat. No. 5,369,720, which is incorporated by reference herein, discloses a stack of optical ribbons secured within a metal tube by an adhesive. The adhesive has a peel strength sufficiently low to permit separation of individual optical ribbons from the stack. One embodiment includes a stack of optical ribbons having a number of ribbons arranged generally parallel to each other, and a further pair of ribbons arranged perpendicular to the generally parallel ribbons and in abutment with edges thereof. In addition, U.S. Pat. No. 5,878,180 discloses a single tube cable including a number of superimposed and adjacent stacks of optical fiber ribbons. The stacks of optical fiber ribbons are arranged over and/or adjacent to each other and in parallel. Another single tube variation, is disclosed in EP-A2-0495241 wherein optical fiber ribbons are tightly received in a zigzagged waterblocking tape. The ribbons are apparently pressed into slots in the zigzagged waterblocking tape. The zigzagged waterblocking tape disadvantageously consumes valuable space inside the tube, increases production costs, requires specialized manufacturing procedures, restricts relative movement of the ribbons during cable bending, increases friction between cable components, and/or adds size and stiffness to the cable.

In addition to attaining a desired fiber count, fiber optic cables should be able to withstand longitudinal compression and tension, and they typically include strength members for these purposes. However, the strength members may disadvantageously affect cable bending performance during installation, and may hinder optical fiber access. A fiber optic cable having strength members located in a single plane generally will experience a preferential bending action favoring bending of the cable out of the plane defined by the strength members. On the other hand, a fiber optic cable having strength members at spaced locations encircling the center of the cable will not have a preferential bend, but the strength members typically include a helical lay so that the cable can be bent. Even taking into account the helical lay of the strength members, when bent in generally any axis, cables of the non-preferential bend type may be very stiff, a characteristic which may be highly undesirable depending upon installation requirements. Thus a cable of the preferential bend type will typically experience ease of cable bending in a preferred plane, and, as there are less strength members to deal with, may present a less time consuming optical fiber access procedure. A cable designer may therefore balance the need to have sufficient cable components for resisting crush, compression, and tension loads, against the size and stiffness contributions of the cable components that may render the cable difficult to install in a cable passageway.

SUMMARY OF THE INVENTION

The present invention is directed to a fiber optic cable having a tube assembly, the tube assembly including a tube, and an optical fiber ribbon stack comprising optical fiber ribbons arranged at least partially in a gradually decreasing optical fiber count profile, the stack being contained in the tube, and a diagonal free space, the diagonal free space being defined as the tube inner diameter minus the maximum diagonal length of the ribbon stack, the maximum diagonal length of the ribbon stack being the greater of either a diagonal measurement across lateral subgroups or a diagonal measurement across a major dimension of a medial subgroup, the diagonal free space being about 0.5 mm to about 5 mm.

The present invention is also directed to a fiber optic cable having a tube assembly including a tube, and an optical fiber ribbon stack comprising optical fiber ribbons arranged at least partially in a gradually decreasing optical fiber count profile, the tube containing the stack, and a diagonal free space, the diagonal free space being defined as the tube inner diameter minus the maximum diagonal length of the ribbon stack, the maximum diagonal length of the ribbon stack being the greater of either a diagonal measurement across lateral subgroups or a diagonal measurement across a major dimension of a medial subgroup, the diagonal free space being about 0.5 mm to about 5 mm, and the fiber optic cable comprising an outside diameter of about 35 mm or less for installation in a 1.50-inch duct.

The present invention is further directed to a fiber optic cable having at least 864 fibers including a tube assembly having a tube, and an optical fiber ribbon stack comprising optical fiber ribbons arranged at least partially in a gradually decreasing optical fiber count profile, the stack being contained in the tube, and a diagonal free space, the diagonal free space being defined as the tube inner diameter minus the maximum diagonal length of the ribbon stack, the maximum diagonal length of the ribbon stack being the greater of either a diagonal measurement across lateral subgroups or a diagonal measurement across a major dimension of a medial subgroup, the diagonal free space being about 0.5 mm to about 5 mm, a central member, the tube assembly being stranded around the central member, and an outer jacket generally surrounding the tube assembly and the central member.

BRIEF DESCRIPTION OF THE FIGS.

FIG. 1 is an isometric view of a fiber optic cable according to an embodiment of the present invention.

FIG. 2 is a cross sectional view of the cable of FIG. 1 taken at line 2—2.

FIG. 3 is a cross sectional view of a fiber optic cable according to the present invention.

FIG. 4 is a cross sectional view of a fiber optic cable according to the present invention.

FIG. 5 is a cross sectional view of a portion of an optical fiber group according to the present invention.

FIG. 7 is a cross-sectional view of another embodiment of the present invention.

FIG. 9 is a cross-sectional view of another embodiment of the present invention.

FIG. 10 is a cross-sectional view of another embodiment of the present invention.

FIG. 11 is a cross-sectional view of another embodiment of the present invention.

FIG. 12 is a cross-sectional view of another embodiment of the present invention.

DETAILED DESCRIPTION OF THE INVENTION

Figure 6:
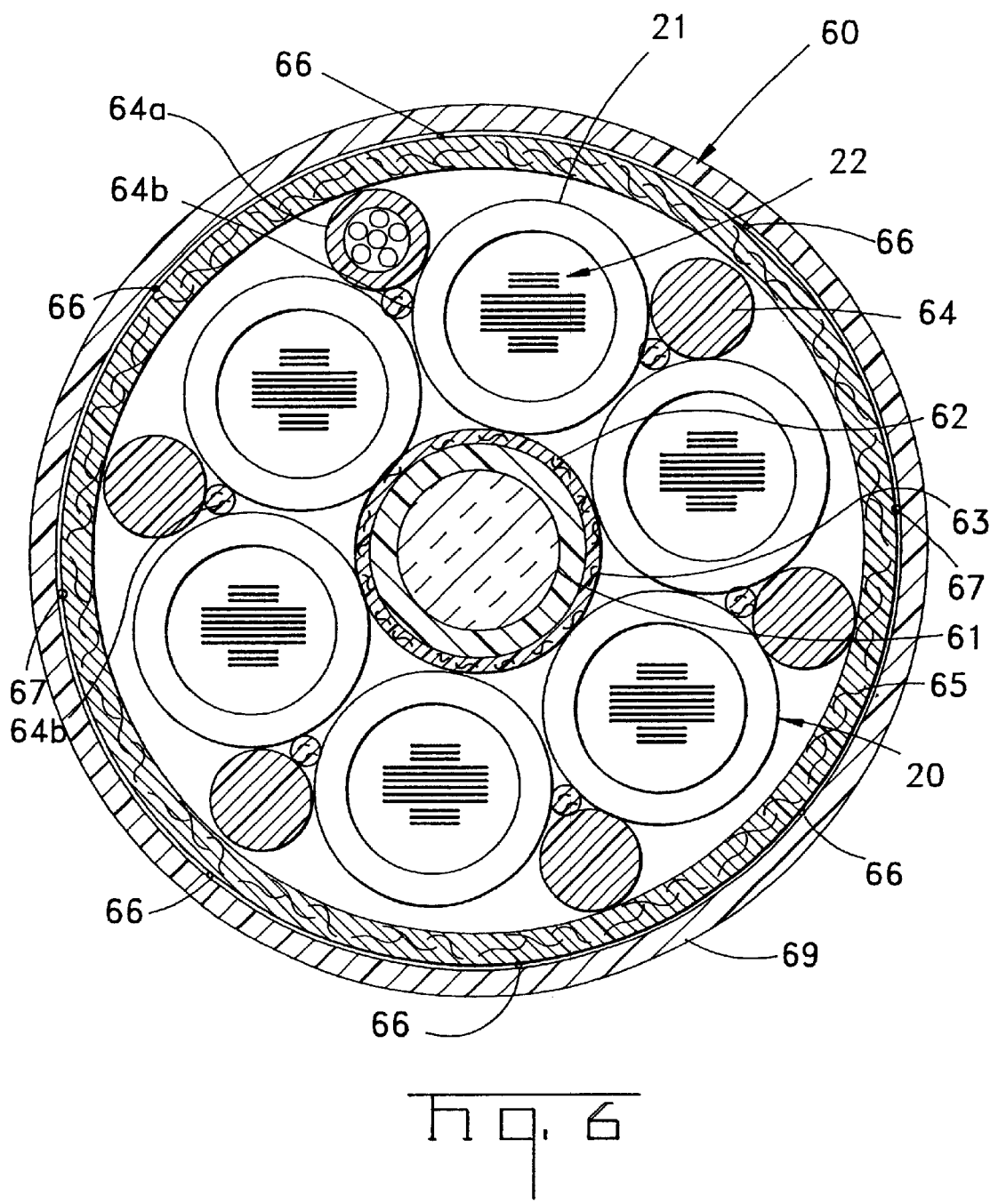
FIG. 6 is a cross-sectional view of another embodiment of the present invention.

Referring to FIGS. 1–2, a first embodiment of the present inventions comprises a tube assembly 20 that includes a tube 21 having an optical fiber group 22 therein. Optical fiber group 22 comprises optical fiber subgroups having respective sets of optical fibers, for example, a set of optical fibers comprises at least one optical fiber ribbon. More specifically, tube 21 can include an optical fiber ribbon group 22 comprising a medial subgroup 23 of optical fiber ribbons with at least one set of lateral subgroups 24a,24b on opposing sides thereof. Lateral subgroups 24a,24b can be immediately flanked by lateral subgroups 25a,25b, and lateral subgroups 25a,25b can be immediately flanked by lateral subgroups 26a,26b. In an exemplary embodiment, medial subgroup 23 contains sixteen layers of optical fiber ribbons, more particularly, each layer includes three 12-fiber subunits; and lateral subgroups 24a,24b each contain six layers of optical fiber ribbons, more particularly, each layer includes two 12-fiber subunits.

Each pair of lateral subgroups 24a,24b;25a,25b;26a,26b may generally have equal fiber counts, however the fiber counts may be unequal. The optical fiber count in lateral subgroups 24a,24b can be in the range of about 2 to about 576 fibers, the optical fiber count in lateral subgroups 25a,25b can be in the range of about 2 to about 432 fibers, and the optical fiber count in lateral subgroups 26a,26b can be in the range of about 2 to about 216 fibers. The optical fiber count in medial subgroup 23 can be in the range of about 3 to about 1008 fibers. A total fiber count for tube assembly 20 can be in the range of about 7 to about 2,000 or more fibers, most preferably about 864 fibers. However, as the total fiber count increases, the outer diameter of tube assembly 20 generally increases. The subgroups contain at least one respective layer having at least one optical fiber ribbon. A layer in a subgroup can comprise one continuous ribbon or one or more separate ribbons in general edge-to-edge alignment, touching or with gaps between the edges.

Each subgroup can be progressively smaller, for example, starting at the medial subgroup and moving to the lateral subgroups. Optical fiber ribbon group 22 can therefore define a step-like profile that can be generally symmetrical about medial subgroup 23. The step-like profile can define a high fiber packing density by substantially filling up the volume of tube 21 with, for example, sets of optical fiber ribbons.

In other words, the fiber packing density of tube assembly 20 can be optimized by the step-like profile. The individual steps of the step-like profile can include a width w (FIG. 5) of at least about one optical fiber diameter, e.g., about 260 microns (±20 microns), and a height h of at least about one ribbon thickness, e.g., about 290 microns (±20 microns). The width w and/or height h can be constant from step to step, or progressively smaller or larger from step to step in the profile (FIG. 1). Further, the width w can be a multiple of a parameter of an optical fiber ribbon, e.g., an integer multiple of a geometric parameter. For example, for facilitating separation of optical fiber subunits from optical ribbon group 22, width w can be roughly equal to the width of an optical fiber subunit within at least one optical fiber ribbon (FIG. 5). Moreover, edges of the subgroups can be aligned with a separation feature of an optical fiber ribbon, for example, a subunit separation area 25c between subunits (FIG. 5), or a separation member embedded in the optical fiber ribbon (not shown).

Tube assemblies including variations of optical fiber ribbon group 22 can be made according to the present invention. For example, a tube assembly 40 (FIG. 3) can be made having an optical fiber ribbon group 42 comprising a medial subgroup 43 of optical fiber ribbons separated by a gap with at least one set of lateral subgroups 44a,44b on opposing sides thereof. Lateral subgroups 44a,44b can be immediately flanked by lateral subgroups 45a,45b having, for example, optical fiber counts that are generally equal to those of subgroups 44a,44b. The subgroups of the present invention can be distinguished from each other by, for example, the number of fibers, subunits, and/or separation features thereof. In addition, a tube assembly 50 (FIG. 4) can be made having an optical fiber ribbon group 52 in a tube 51 comprising a medial subgroup 53 turned on edge with respect to at least one set of lateral subgroups 54a,54b on opposing sides thereof. Lateral subgroups 54a,54b can be immediately flanked by lateral subgroups 55a,55b.

At least some of the optical fiber ribbons and/or subgroups of optical fiber groups 22,42,52 have low frictional characteristics for sliding contact therebetween. For example, certain optical fiber ribbons and/or each ribbon in an entire subgroup 22,42,52 can be separated from adjacent ribbons by a film thickness of a lubricant 27 shown schematically in FIG. 5. Lubricant 27 can be a viscous substance, for example a gel, a liquid, or a grease-like substance that permits sliding contact between optical ribbons within a subgroup and/or subgroups 22,42,52. A suitable pre-wet method for applying a lubricant between optical ribbons is disclosed in U.S. Pat. No. 5,348,586, which is incorporated by reference herein. In one embodiment, the film thickness is preferably a prewet layer thickness of grease applied between optical fiber ribbons, which thickness is preferably between about 0.01 mm and about 0.10 mm, but is most preferably between about 0.01 mm and about 0.04 mm. The prewet layer thickness is controlled so that the overall cable diameter is minimized, and to insure that attenuation is not induced by the ribbon print identification. Ribbon print identification is described in U.S. Pat. No. 6,064,798, which is incorporated by reference herein. In a preferred embodiment, prewet coverage should be complete with print spacing on inner ribbons of about 3.5 mm to about 4.0 mm, and more preferably about 3.80 mm to about 3.85 mm or more characters/cm. In addition, the optical fiber ribbons or subgroups can be separated by a lubricant comprising a superabsorbent substance dispersed therein. Alternatively, the outer common matrix of one or more optical ribbons can include a non-compatible material, e.g., a silicone containing material that migrates to the surface thereof for low frictional characteristics. Moreover, low frictional characteristics can be attained without the use of a lubricant or non-compatible substance. For example, one or more subgroups can contain one or more optical fiber ribbons having an advantageously low coefficient of friction matrix material as described in U.S. Pat. No. 5,561,730, which is incorporated by reference herein.

For maintaining stack integrity, optical fiber ribbon groups 22,42,52 can be held together by binders (not shown). Optical fiber ribbons or subgroups can be bonded together with a cured resin, e.g., an UV curable acrylate material. Extrusion of tubes 21,41,51 about ribbon groups 22,42,52 can be accomplished in a buffering line, for example, as disclosed in U.S. Pat. No. 5,312,499, which is incorporated by reference herein. More specifically, optical fiber ribbon groups 22,42,52 can be fed through a device that extrudes tubes 21,41,51 and applies a waterblocking grease therearound. As this occurs, ribbon groups 22,42,52 can be helically twisted as a unit in a lay length in the range of about 200 mm to about 1500 mm along its longitudinal axis. The buffering line can be constructed so that a clearance, more particularly, a diagonal free space is defined between optical fiber ribbon groups 22,42,52 and the wall of tubes 21,41,51 as will be discussed herein.

Any of tube assemblies 20,40,50 can be used as a component in various fiber optic cable applications. For example, at least one tube assembly 20,40,50 can be stranded about a central member of the kind disclosed in U.S. Pat. No. 5,621,841, which is incorporated by reference herein. Alternatively, at least one tube assembly 20,40,50 can be disposed in a slot of a slotted rod of the kind disclosed in U.S. Pat. No. 6,052,502 which is incorporated by reference herein. Moreover, a tube assembly 20,40,50 can be used to define a core in a mono-tube application.

To illustrate, an exemplary application of tube assembly 20 functioning as a core of a mono-tube type fiber optic cable 10 (FIGS. 1–2) will be described. In addition, tube assembly 40 is shown as the core of a mono-tube type fiber optic cable 10' (FIG. 3). Fiber optic cable 10 includes tube assembly 20 as the core thereof, and one or more strength assemblies 30 are adjacent thereto for resisting bend, crush, and longitudinal compression and tension forces. In one embodiment, tube 21 includes a grease-like waterblocking substance therein.

A typical strength assembly 30, which can be supported by tube 21, includes one or more strength members, and may include portions of a first plastic jacket, an armor tape, and a second plastic jacket. In one embodiment, a water-swellable tape 28 is interposed between tube 21 and the strength assemblies. The tube tensile modulus is preferably about 800 MPa to about 1500 Mpa, but is most preferably about 1000 MPa to about 1200 MPa. In the embodiments of FIGS. 1–3, and as disclosed in U.S. Pat. No. 6,101,305, which is incorporated by reference herein, strength assembly 30 may include one or more longitudinally disposed strength members 32, a portion of a first jacket 35, a portion of a corrugated or flat armor tape 38 of the metallic or plastic type, and a portion of a second jacket 39. However, where an armor layer and a second jacket are not required, jacket 35 may comprise the exterior surface of the cable, in which case, strength assembly 30 would not include those components. The jacket material is preferably a medium density polyethylene material, more preferably with a low melt temperature characteristic for avoiding melting through tape 28. Jacket 35 preferably has an outside diameter of about 26 mm or less, rendering the cables suitable for installation in a duct having an ID of about 1.25 inches or more. However, jacket 35 may have other diameters for rendering the cable suitable for ducts of other sizes.

Strength assemblies 30, when located on opposite sides of tube 21, can impart a preferential bend characteristic to fiber optic cables 10,10'. A preferential bend plane X—X (FIG. 2) is generally defined by strength members 32. At least one of strength assemblies 30 includes a strength member 32 coupled to first jacket 35; preferably, all strength members should be coupled to jacket 35. A thin waterblocking layer 36, for example a conventional waterblocking tape, can be disposed between first and second jackets 35,39. Alternatively, waterblocking layer 36 may be a water-swellable coating deposited on tape 38. Ripcords 34 and 37 may be placed along strength members 32 and adjacent tape 36, respectively (FIGS. 1–2).

Strength members 32 can be made of a pre-formed metallic material, e.g., steel, or a dielectric material, e.g., glass reinforced plastic and are preferably about 1.75 mm to about 2.25 mm in diameter, more preferably, about 2.0 mm in diameter. In addition, the preferred material for the strength members is one that produces a minimum of hydrogen at high temperatures. Strength members 32 preferably include a thin coating of a low-modulus thermoplastic resin compound for waterblocking purposes. The resin may include a water-swellable material, for example, a superabsorbent substance. The resin preferably enhances adhesion between strength members 32 and jacket 35. A given strength assembly 30 can include two or more strength members 32 that can be coupled to each other by action of the water-swellable material, and can be coupled to jacket 35. As an alternative or in addition to the water-swellable material, waterblocking yarns 33 may be disposed along strength members 32 (FIGS. 1–2). In one embodiment, the strength members determine the E·A of the cable design. E·A is the modulus (E) of the strength element material times the cross-sectional area (A). This value is used, in accordance with one embodiment of the present invention, to determine the tensile strength and anti-buckling strength of the cable. A preferred E·A is in the range of about 500,000 to about 900,000 MPa*mm$^2$, more preferably, about 700,000 MPa*mm$^2$.

Fiber optic cables of the present inventions are preferably constructed for outdoor applications, but may have indoor applications. During bending of the cable, optical fiber ribbon group 22,42 can bend about plane X, and the respective subgroups and/or the optical fiber ribbons therein may slide relative to each other for relieving stress in the optical ribbons. Additionally, the clearance between tube 21,41 and optical fiber ribbon groups 22,42 allows for some adjustment in the lay length of group 22 during cable bending.

Diagonal free space is defined as the tube inner diameter minus the maximum diagonal length, D1, D2, D3, ... or DNth of a cross-section of the ribbon stack profile generally passing through the center of the stack, i.e., generally the diagonal length of the medial group or lateral subgroups. For example, as illustrated in FIG. 2, the maximum diagonal length may be: dimension D1, which is a diagonal measurement across distal lateral subgroups 26a,26b; D2, which is a diagonal measurement across lateral subgroups 25a,25b; D3, which is a diagonal measurement across lateral subgroups 24a,24b; or D4, which is diagonal measurement across a major dimension of the medial subgroup. According to the present inventions, diagonal free space is controlled for cable quality as defined in Bellcore/Telcordia GR-20-CORE, Issue Jul. 3, 1988. In preferred embodiments, the diagonal free space of the ribbon stack profile is about 0.5 mm to about 5 mm, more preferably about 1 mm to about 3 mm, most preferably about 1.5 mm to about 2.5 mm. In an exemplary 864-fiber cable, the ribbon stack diagonal is preferably about 10 mm to about 13 mm. In the preferred 864 fiber embodiment, medial subgroup 23 contains sixteen layers of optical fiber ribbons, more particularly, each layer includes three 12-fiber subunits; additionally, lateral subgroups 24a,24b each contain six layers optical fiber ribbons, more particularly, each layer includes two 12-fiber subunits.

Having four subgroups can allow group 22 to adjust during bending and facilitate termination and/or separation procedures. In an exemplary embodiment, the preferred ribbon stack configuration has potential points of contact with tube 21, that is, contact of corner fibers C (FIGS. 2 and 5). In preferred embodiments, a corner fiber optical attenuation delta of less than about 0.05 dB/Km for a wavelength of @ 1550 nm over a 100 meter length is achieved on a 40" to 70" drum, more preferably, on a 60" drum, at room temperature.

FIG. 6 illustrates an explanatory embodiment of a fiber optic cable of the present invention. Fiber optic cable 60 has one or more tube assemblies 20 stranded about a central member 61, however other suitable tube assemblies, for example, 40 or 50 may be used. For example, stranding of tube assemblies can be S-Z or planetary with exemplary lay lengths between about 400 mm to about 1000 mm. In another embodiment, suitable tube assemblies can be stranded about a central member in a cable constructed generally in accordance with U.S. Pat. No. 6,014,487, which is incorporated by reference herein. Central member 61 is a thermoplastic-coated glass reinforced plastic strength element having a diameter of about 9.5 mm, however other suitable strength elements of other materials and/or different diameters may be used. For example, central member 61 may be strength element such as a dielectric that includes a plurality of relatively small glass reinforced plastic strength elements jacketed in a thermoplastic, a conductive material such as steel, or a semi-conductive material such as carbon fiber. Additionally, central member 61, or another suitable cable component, may include, for example, a copper coated steel, for tonability purposes, that is, locating a buried cable by sending an electrical signal through the conductive material. In general, central member 61 can have about the same relative outer diameter as stranded tube assemblies, but may have other outer diameters (FIGS. 9–12). A water-swellable tape 63 is interposed between central member 61 and the stranded tube assemblies, however central member 61 may include a water-swellable material on its outer surface or embedded therein or water-swellable yarns may be used. Likewise, any of the tube assemblies may include a water-swellable material on their outer surfaces or embedded therein. In one 1728 fiber embodiment, cable 60 contains six tubes 21 each tube having eight 24-fiber ribbons and eight 12-fiber ribbons in a stepped ribbon stack configuration for high fiber packing density. However, cable 60 may include embodiments having a different number of tube assemblies stranded around the central member (FIGS. 9–12).

Filler rods 64 can be disposed between tubes 21 to provide crush resistance, however in lieu of one or all of the filler rods 64 small buffer tubes with colored fibers, bundled fibers, ribbons or other suitable optical waveguides could be included to further increase the fiber count of cable 60. For example, a tube 64a having an outer diameter of about 4 mm can contain 24 colored fibers, however tubes 64a of other sizes may be used. Rods 64 or tubes 64a may include a water-swellable material on their outer surfaces or embedded therein or a water-swellable yarn 64b may be stranded adjacent to tube 21 and rod 64. Rods 64 may also be a strength assembly, an element providing tensile strength and/or a tonability element. For example, a conductor such as a twisted pair may be substituted for one or more rods 64 or rod 64 may include a copper tape wrapped therearound.

The manufacture of cable 60 may be performed in two operations, namely, a stranding operation and a jacketing operation. In the stranding operation, for example, tubes 21, rods 64, and yarns 64b are stranded around central member 61 and tape 63 and held together by a first binder yarn (not illustrated) forming a stranded assembly. The first binder yarn may be, for example, a polyester binder yarn. The binder yarn preferably includes a helical lay length of between about 20 mm and about 30 mm. A water-swellable tape 65 is generally disposed around the stranded assembly. Tape 65 preferably is held in place by a second polyester binder yarn (not shown) counter-helically wound with respect to the first binder yarn. The second binder yarn and tape 65 generally disposed around the stranded assembly complete the stranding operation and define a core of cable 60. In the jacketing operation, for example, a plurality of aramid fibers 66, preferably about three to about ten, more preferably, eight fibers are helically wound around the core of cable 60, however other suitable strength components may be used. A ripcord 67 may be disposed between fibers 66 and an outer jacket 69 to aid the craftsman in removing outer jacket 69. More preferably, two ripcords 67 are longitudinally disposed about 180 degrees apart. Outer jacket 69 is then extruded around ripcords 67, fibers 66, and the cable core providing cable 60 protection from environmental elements.

In another embodiment, the outside diameter of cable 60 is about 36 mm or less, more preferably, about 35 mm or less and, most preferably, about 32 mm or less such that the cable is installable in a 1.50-inch duct. However, other outer diameters may be used for other applications, for example, different duct sizes or non-duct installations. A cable fill ratio of a duct can be calculated by dividing a square of an outer diameter of a cable by a square of inner diameter of the duct. Generally, the higher the fill ratio the more difficult it is to route the cable in the duct. Fill ratios are generally in the range of about 65% to about 85%.

Cable 60 may have tubes 21 with the same optical fiber group 22 configurations or cable 60 may have tubes 21 with different optical fiber group 22 configurations having the same or different numbers of optical fibers. For example, tube 21 may contain a 4/8/4 optical fiber group configuration or a 6/6/6 optical fiber group configuration. Illustrative of the 4/8/4 optical fiber group configuration is a medial subgroup 23 containing eight layers of optical fiber ribbons, more particularly, each layer includes two 12-fiber subunits; and lateral subgroups 24a,24b each including four layers of optical fiber ribbons, more particularly, each layer includes one 12-fiber subunit for a 288 optical fiber count of group 22. Illustrative of the 6/6/6 optical fiber group configuration is a medial subgroup 23 containing six layers of optical fiber ribbons, more particularly, each layer includes two 12-fiber subunits; and lateral subgroups 24a,24b each including six layers of optical fiber ribbons, more particularly, each layer includes one 12-fiber subunit for a 288 optical fiber count of group 22. Thus, in one embodiment, cable 60 can have a total optical fiber count of up to 1728 fibers or more. However, other optical fiber group configurations and/or cable designs can be used resulting in other optical fiber counts. Fiber packing density could be increased further by utilizing, for example, 24-fiber, 18-fiber, 12-fiber, and/or 6-fiber ribbons.

In one embodiment designed for use in a 1.50-inch duct, tube 21 includes an outer diameter in the range of about 9.0 mm to about 11.0 mm, more preferably in the range of about 9.5 mm to about 10.5 mm and an inner diameter in the range of about 7.0 mm to about 9.0 mm, more preferably in the range of about 7.5 mm to about 8.5 mm. The maximum ribbon stack diagonal of the stepped profile is in the range of about 5.0 mm to about 8.0 mm, more preferably in the range of about 5.5 mm to about 6.5 mm. The diagonal free space is in the range of about 0.5 mm to about 5.0 mm, more preferably in the range of about 1 mm to about 3 mm. However, embodiments having other suitable tube, stack diagonal and diagonal free space dimensions may be used.

FIG. 7 illustrates an explanatory cable 70, similar to cable 60 of FIG. 6, having an armor tape 78 forming an armor layer for providing, for example, crush resistance. Armor tape 78 is generally disposed between a core of cable 70 and outer jacket 79. Cable 70 may also include a ripcord 77 disposed between the core of cable 70 and armor tape 78. Armor tape 78 generally makes cable 70 stiffer and increases the outer diameter of cable 70, which may make cable 70 more difficult to route in a duct, however an armor tape 78 may be suitable for other applications, for example, buried environments. Cable 70 may include components not illustrated, but described in cable 60, for example, water-swellable tapes, yarns and materials, aramid fibers, binder yarns, ripcords and/or small buffer tubes. Cable 70 may also exclude, for example, armor tape 78 or other components.

Cable 70 includes a central member 71, more particularly, central member 71 is a cable containing optical fibers and strength assemblies 72 embedded in a jacket 75. For example, optical fiber ribbon group 22 contained in central member 71 may include 144 optical fibers resulting in a total fiber count of cable 70 of up to 1872 fibers or more, however other suitable types or arrangements of optical fibers may be contained in central member 71. Central member 71 has an outer diameter preferably having a range of about 5 mm to about 12 mm, and more preferably, having a range of about 7 mm to about 10 mm. Central member 71 preferably includes an outer diameter of about the same outer diameter of tubes 21, however central member 71 may include other suitable diameters.

In particular, central member 71 is a cable having a non-preferential bend characteristic, however central member 71 may include a cable having a preferential bend characteristic. Cable 70 generally replaces central member 61 FIG. 6 with central member 71 in order to increase fiber packing density, so strength assemblies 72 of central member 71 preferably should provide about the same or more tensile strength than central member 61. Strength assemblies 72 of central member 71 include a plurality of generally flat glass reinforced plastic members helically embedded and coupled to jacket 75.

FIG. 7b illustrates central member 71b, a cable having a preferential bend characteristic for use in cable 70. Central member 71b includes two strength assemblies 72b, more particularly, assemblies 72b each include two strength members 73b coupled to a jacket 75b of central member 71b. Strength members 73b may be steel, but other suitable materials that provide strength may be used.

FIG. 7c illustrates central member 71c, another cable for use in cable 70. Central member 71c may be, for example, an ALTOS® cable available from Corning Cable Systems of Hickory, N.C. Central member 71c includes a plurality of tubes 72c, containing optical fibers, stranded about a central strength member 73c. Jacket 75c generally surrounds central strength member 73c and tubes 72c. Central members 71, 71b, 71c may include components not illustrated, for example, water-swellable tapes, yarns and materials, aramid fibers, binder yarns, ripcords and/or armor tapes. Moreover, central members 71, 71b and 71c are illustrative and other suitable cables may be employed as central members.

Figure 8:
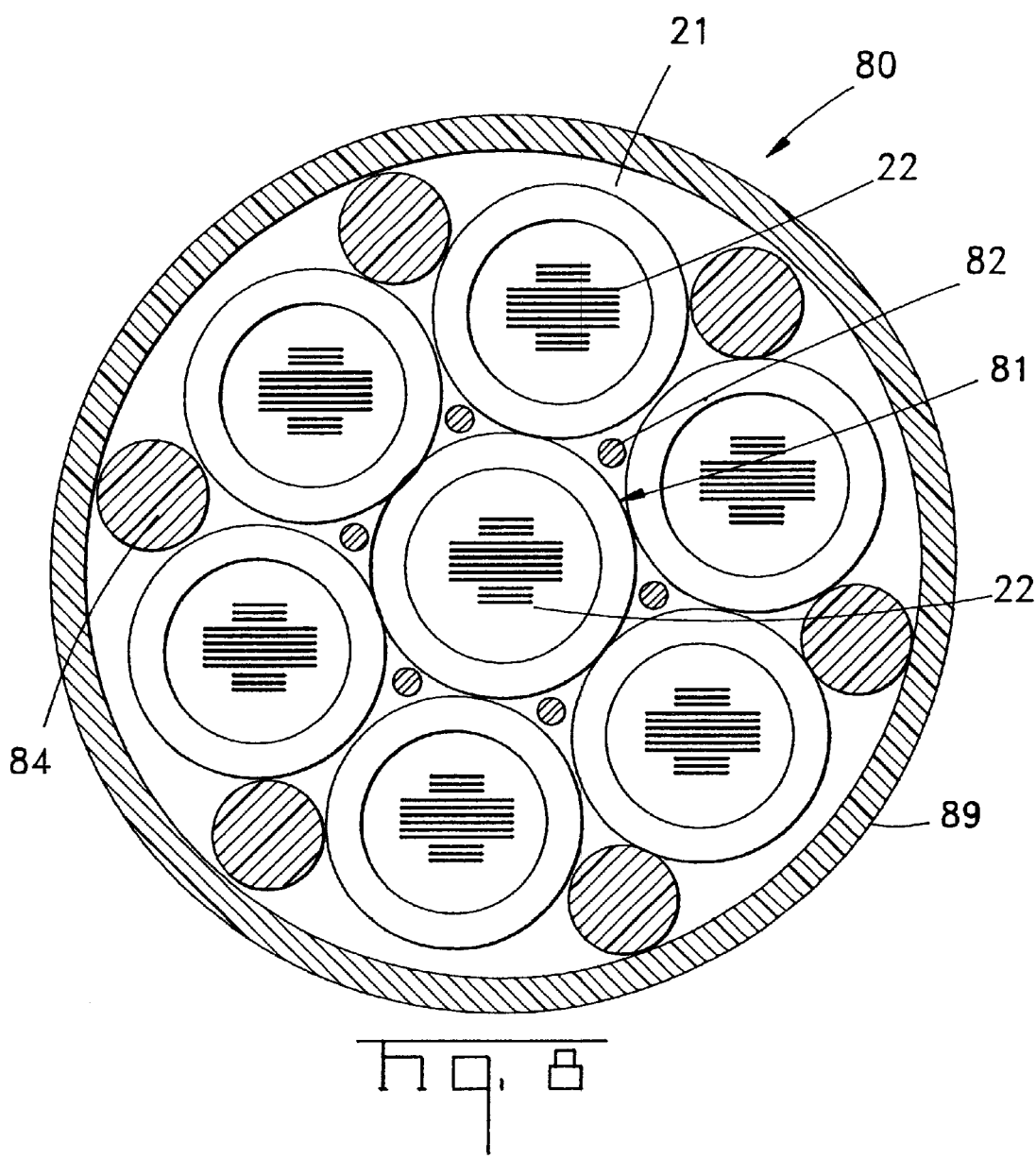
FIG. 8 is a cross-sectional view of another embodiment of the present invention.

FIG. 8 illustrates another explanatory cable 80, similar to cable 60 of FIG. 6, having a central member 81, more particularly, a central tube assembly containing optical fibers, having tube assemblies stranded therearound and disposed within an outer jacket 89. For example, optical fiber ribbon group 22 contained in central member 81 may include 288 fibers resulting in a total fiber count of cable 80 of up to 2016 fibers or more; however, other suitable types or arrangements of optical fibers may be contained in central member 81. Central member 81 preferably includes an outer diameter having about the same outer diameter as tubes 21, but may include other suitable diameters. Cable 80 includes strength members 82 providing, for example, tensile strength. Cable 80 includes strength members 82, which generally replaces central member 61 of FIG. 6, in order to increase fiber packing density, so strength members 82 preferably should provide about the same or more tensile strength than central member 61. Central member 81 may include other shapes besides round, for example, central member 81 may have concave areas (not shown) on its outer surface for holding strength members 82 in position during manufacture. Cable 80 may include components not illustrated, but described in cable 60, for example, water-swellable tapes, yarns and materials, aramid fibers, binder yarns, ripcords and/or small buffer tubes.

Figure 8B:
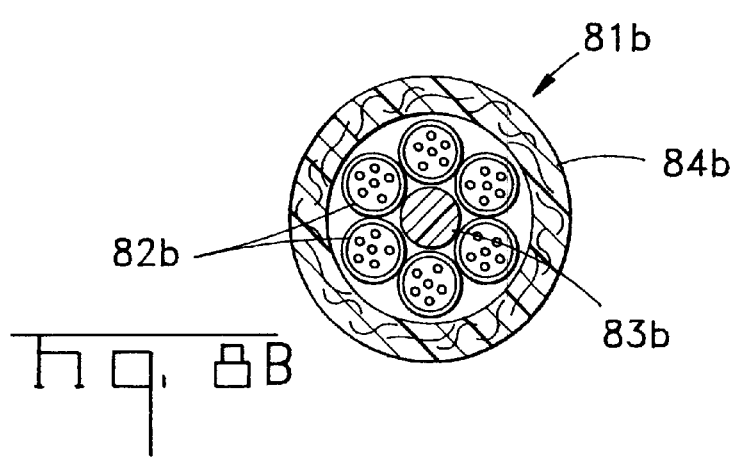

FIG. 8b illustrates central member 81b, more particularly, a central tube assembly including a plurality of tubes 82b, containing optical fibers, stranded about a central strength member 83b. Central member 81b is similar to central member 71b, except that central member 81b excludes jacket 75c to provide an increased fiber packing density of cable 80. Water-swellable tape 84b generally surrounds tubes 82b and is secured with a binder yarn (not shown). Central members 81 and 81b may include components not illustrated, for example, water-swellable tapes, yarns and materials, aramid fibers, binder yarns, and/or ripcords. Moreover, central members 81 and 81b are illustrative and other suitable tube assemblies may be employed as central members.

FIGS. 9–12 illustrate explanatory cables 90, 100, 110 and 120 that are similar to cable 60 of FIG. 6, but include different numbers of tube assemblies stranded about central members 91, 101, 111 and 121. Cables 90, 100, 110 and 120 include outer jackets 99, 109, 119 and 129 generally extruded around the respective cable cores and other suitable components, for example, aramid fibers and/or ripcords (not shown).

Cable 90 includes different size tube assemblies, each size generally having different optical fiber group 22 configurations, stranded around central member 91 and a plurality of filler rods 94 and/or 92, however, filler rods 94 may be strength elements. For example, a larger tube assembly may have an outer diameter of about 12 mm and a smaller tube assembly may have an outer diameter of about 8 mm. The larger and smaller tube assemblies are stranded about central member 91. For instance, central member 91 may be a glass reinforced plastic member having an outer diameter of about 5 mm. The combination of these components yields a cable having an outer diameter of about 33 mm, however other suitable sized tube assemblies and central members may be used to construct cable having other outer diameters. For example, the larger and smaller tube assemblies of cable 90 may include a 528 optical fiber group configuration and a 144 optical fiber group configuration, respectively, for a 2016 optical fiber cable. More specifically, the 528 optical fiber group may include a medial group of eighteen 24-fiber ribbons and two lateral subgroups each having four 12-fiber ribbons and the 144 optical fiber group may include twelve 12-fiber ribbons. However other optical fiber counts can be employed in cables of generally the same, or other suitable, outer diameters.

Illustratively, cable 90 may include a larger and smaller tube assembly having a 456 optical fiber group configuration with a tube outer diameter of about 11 mm and a 120 optical fiber group configuration with a tube outer diameter of about 8 mm, respectively. The cable also includes central member 91 that may be a glass reinforced plastic member having an outer diameter of about 5 mm and filler rods 94 having an outer diameter of about 3 mm. The combination of these components yields a 1728 optical fiber cable having an outer diameter of about 31 mm. More specifically, the 456 optical fiber group may include a medial group of sixteen 24-fiber ribbons and two lateral subgroups each having three 12-fiber ribbons and the 120 optical fiber group may include ten 12-fiber ribbons.

Cable 100 includes four tube assemblies of about the same outer diameter and filler rods 104 stranded around central member 101. For example, each tube assembly may have an outer diameter of about 11 mm and filler rods 104 may have an outer diameter of about 5 mm. Central member 101 may be, for instance, a glass reinforced plastic member having an outer diameter of about 5 mm. The outer diameter of cable 100 is about 31 mm using these components. However other suitable sized tube assemblies, central members, and filler rods may be used to construct cable having other outer diameters.

Illustratively, cable 100 may include a 432 optical fiber group configuration in the tube assemblies for a 1728 optical fiber cable. More specifically, the 432 optical fiber group may include a medial group of fourteen 24-fiber ribbons and two lateral subgroups each having four 12-fiber ribbons. However other optical fiber counts can be employed, for example, four 504 optical fiber group configurations for a 2016 optical fiber cable.

Cable 110 includes five tube assemblies of about the same outer diameter and filler rods 114 stranded around central member 111. For example, each tube assembly may have an outer diameter of about 10 mm and filler rods 114 may have an outer diameter of about 5 mm. Central member 111 may be, for instance, a glass reinforced plastic member having an outer diameter of about 8 mm. The outer diameter of cable 110 is about 32 mm using these components. However, other suitable sized tube assemblies, central members, and filler rods may be used to construct cable having other outer diameters.

Illustratively, cable 110 may include a 360 optical fiber group configuration in the tube assemblies for an 1800 optical fiber cable. More specifically, the 360 optical fiber group may include a medial group of ten 24-fiber ribbons and two lateral subgroups each having five 12-fiber ribbons. However other optical fiber counts can be employed.

Cable 120 includes eight tube assemblies of about the same outer diameter and filler rods 124 stranded around central member 121. For example, each tube assembly may have an outer diameter of about 10 mm and filler rods 114 may have an outer diameter of about 4 mm. Central member 111 may be, for instance, a glass reinforced plastic member having an outer diameter of about 16 mm. The outer diameter of cable 120 is about 39 mm using these components. However, other suitable sized tube assemblies, central members, and filler rods may be used to construct cable having other outer diameters.

Illustratively, cable 120 may include a 216 optical fiber group configuration in the tube assemblies for a 1728 optical fiber cable. More specifically, the 216 optical fiber group may include a medial group of eighteen 12-fiber ribbons. However, other optical fiber counts can be employed.

Cables 90, 100, 110 and 120 may include components not illustrated, but described in cable 60, for example, water-swellable tapes, yarns and materials, aramid fibers, binder yarns, ripcords and/or small buffer tubes. Cables 90, 100, 110 and 120 may also include an armor tape. Additionally, central members 91, 101, 111 and 121 may be cables or central tube assemblies, as described in FIGS. 7–8b, to increase fiber packing density.

The present inventions have thus been described with reference to the exemplary embodiments, which embodiments are intended to be illustrative of inventive concepts rather than limiting. Persons of ordinary skill in the art will appreciate that variations and modifications of the foregoing embodiments may be made without departing from the scope of the appended claims. Tube assemblies 20,40,50 may be used in a mono-tube fiber optic cable of the non-preferential bend type. Tube assemblies 20,40,50 can include more or less lateral subgroups, and/or no medial subgroup. The step-like profile can include the interposition of a subgroup having a larger or smaller fiber count than neighboring subgroups. Tubes 21,41,51 can comprise a non-round or metallic shape, and/or a jacket with embedded strength members as disclosed in U.S. Pat. No. 4,887,354 incorporated by reference herein. Tubes 21,41,51 can be formed of one or more layers of thermoplastic material, e.g. polyethylene, polypropylene, and/or polystyrene, that is chemically suitable for use with any lubricant, superabsorbent, and/or grease-like waterblocking substance therein. Each ribbon/subunit in a subgroup can be marked for ease of identification even in the event the subgroup shifts during cable bending. Further, the optical fiber subgroups can respectively include generally unequal optical fiber counts (not shown). Optical fiber subgroups can include ribbons with subunits as disclosed in U.S. Pat. No. 5,524,164, and or separable ribbons as disclosed in U.S. Pat. No. 5,442,722, which are incorporated by reference herein. In addition, the optical fiber group can include optical fiber sets other than or in addition to ribbons, for example, fiber bundles, dropcords, zipcords, and/or interconnect cables. Optical fibers that are less bend-sensitive can be placed in predefined locations in a group/subgroup/ribbon for maintaining a low overall attenuation of the fiber optic cable. Tube 21 can be coated or impregnated with a superabsorbent material. At least some of the flanking optical fiber subgroups can be disposed edge-to-edge with respect to each other and/or the medial subgroup.

That which is claimed:

1. A fiber optic cable having at least one tube assembly, said at least one tube assembly comprising:
   a tube;
   an optical fiber ribbon stack comprising optical fiber ribbons arranged at least partially in a gradually decreasing optical fiber count profile, said optical fiber ribbon stack being contained in said tube; and
   a diagonal free space, said diagonal free space being defined as the tube inner diameter minus the maximum diagonal length of said optical fiber ribbon stack, said maximum diagonal length of said optical fiber ribbon stack being the greater of either a diagonal measurement across lateral subgroups of said optical fiber ribbon stack or a diagonal measurement across a major dimension of a medial subgroup of said optical fiber ribbon stack, said diagonal free space being about 0.5 mm to about 5.0 mm.

2. The fiber optic cable of claim 1, said diagonal free space being about 1 mm to about 3 mm.

3. The fiber optic cable of claim 1, said tube assembly being stranded about a central member.

4. The fiber optic cable of claim 3, said central member containing at least one optical fiber therein.

5. The fiber optic cable of claim 3, said central member including strength members.

6. The fiber optic cable of claim 3, said central member being a cable.

7. The fiber optic cable of claim 3, said central member being a tube assembly.

8. The fiber optic cable of claim 1, said cable having at least 864 optical fibers or more.

9. The fiber optic cable of claim 1, a prewet layer of grease being disposed between at least some of said optical fiber ribbons, said prewet layer thickness being about 0.01 mm to about 0.10 mm.

10. The fiber optic cable of claim 1, further comprising an armor tape disposed within an outer jacket.

11. The fiber optic cable of claim 1, said fiber optic cable comprising strength members, said strength members defining an E·A value of about 500,000 to about 900,000 MPa*mm$^2$.

12. The fiber optic cable of claim 1, said optical fiber count profile comprising corner fibers, at least some of said corner fibers having a delta optical attenuation of less than about 0.05 dB/Km for a wavelength of @ 1550 nm over a 100 meter length when said fiber optic cable is wrapped about on a 40" to 70" diameter drum.

13. A fiber optic cable, comprising:
   at least one tube assembly, said tube assembly comprising a tube and an optical fiber ribbon stack comprising optical fiber ribbons arranged at least partially in a gradually decreasing optical fiber count profile, said tube containing said optical fiber ribbon stack, and a diagonal free space, said diagonal free space being defined as the tube inner diameter minus the maximum diagonal length of said optical fiber ribbon stack, said maximum diagonal length of said optical fiber ribbon stack being the greater of either a diagonal measurement across lateral subgroups of said optical fiber ribbon stack or a diagonal measurement across a major dimension of a medial subgroup of said optical fiber ribbon stack, said diagonal free space being about 0.5 mm to about 5.0 mm; and
   said fiber optic cable having an outside diameter of about 35 mm or less.

14. The fiber optic cable of claim 13, said diagonal free space being about 1 mm to about 3 mm.

15. The fiber optic cable of claim 13, said cable having at least 864 optical fibers or more.

16. The fiber optic cable of claim 13, said fiber optic cable having an outside diameter of about 33 mm or less.

17. The fiber optic cable of claim 13, said tube assembly being stranded about a central member.

18. The fiber optic cable of claim 17, said central member containing at least one optical fiber therein.

19. The fiber optic cable of claim 17, said central member including strength members.

20. The fiber optic cable of claim 17, said central member being a cable.

21. The fiber optic cable of claim 17, said central member being a tube assembly.

22. A fiber optic cable having at least 864 optical fibers, comprising:
   at least one tube assembly, said at least one tube assembly comprising a tube and an optical fiber ribbon stack comprising optical fiber ribbons arranged at least partially in a gradually decreasing optical fiber count profile, said optical fiber ribbon stack being contained in said tube, and a diagonal free space, said diagonal free space being defined as the tube inner diameter minus the maximum diagonal length of said optical fiber ribbon stack, said maximum diagonal length of said optical fiber ribbon stack being the greater of either a diagonal measurement across lateral subgroups of said optical fiber ribbon stack or a diagonal measurement across a major dimension of a medial subgroup of said optical fiber ribbon stack, said diagonal free space being about 0.5 mm to about 5.0 mm;

a central member, said at least one tube assembly being stranded around said central member; and an outer jacket generally surrounding said at least one tube assembly and said central member.

23. The fiber optic cable of claim 22, said central member containing at least one optical fiber therein.

24. The fiber optic cable of claim 22, said central member including strength members.

25. The fiber optic cable of claim 22, said central member being a cable.

26. The fiber optic cable of claim 22, said central member being a tube assembly.

27. The fiber optic cable of claim 22, said optical fiber count profile comprising corner fibers, at least some of said corner fibers having a delta optical attenuation of less than about 0.05 dB/Km for a wavelength of @ 1550 nm over a 100 meter length when said fiber optic cable is wrapped about a 40" to 70" drum at room temperature.

28. The fiber optic cable of claim 22, said cable having at least 1728 optical fibers or more.

29. The fiber optic cable of claim 22, a prewet layer of grease being disposed between at least some of said optical fiber ribbons, said prewet thickness being about 0.01 mm to about 0.10 mm.

30. The fiber optic cable of claim 22, at least some of said optical fiber ribbons comprising print identification markings in the form of characters with a print spacing, said print spacing on at least some of said optical fiber ribbons being about 3.5 mm to about 4.0 mm.

31. The fiber optic cable of claim 22, said fiber optic cable comprising strength members, said strength members defining an E·A value of about 500,000 to about 900,000 MPa*mm$^2$.

32. The fiber optic cable of claim 22, further comprising an armor tape disposed within said outer jacket.

* * * * *